United States Patent
Hayashi et al.

(10) Patent No.: US 6,844,811 B2
(45) Date of Patent: Jan. 18, 2005

(54) SPEEDOMETER DISPLAY AND METHOD FOR MOTOR VEHICLES

(75) Inventors: Toshiaki Hayashi, Uraysu (JP); Robert S. Murdock, Oakland, CA (US); Norio Fujikawa, San Francisco, CA (US); Peter Petras, San Francisco, CA (US)

(73) Assignee: Coato Workshop Inc., Tokyo (JP)

( * ) Notice: Subject to any disclaimer, the term of this patent is extended or adjusted under 35 U.S.C. 154(b) by 0 days.

(21) Appl. No.: 10/087,201

(22) Filed: Mar. 1, 2002

(65) Prior Publication Data

US 2003/0164757 A1 Sep. 4, 2003

(51) Int. Cl.⁷ .................................................. B60Q 1/00
(52) U.S. Cl. ...................... 340/441; 340/461; 340/438; 340/439; 340/425.5; 340/462
(58) Field of Search ................................. 340/461, 438, 340/439, 459, 462, 425.5, 815.4, 441; 116/62.1, 62.2, 62.3, 252, 299; 73/1.37, 488

(56) References Cited

U.S. PATENT DOCUMENTS

| | | | |
|---|---|---|---|
| 3,520,994 A | * | 7/1970 | McAfee ...................... 178/6.8 |
| 5,453,939 A | | 9/1995 | Hoffman et al. |
| 5,801,667 A | * | 9/1998 | Shimizu et al. ............. 340/436 |
| 5,847,704 A | * | 12/1998 | Hartman ..................... 340/461 |
| 5,969,224 A | * | 10/1999 | Ebara et al. ................ 340/441 |
| 6,060,985 A | * | 5/2000 | Siviero ........................ 340/461 |
| 6,407,663 B1 | * | 6/2002 | Huggett ....................... 340/461 |

* cited by examiner

Primary Examiner—Hung Nguyen
(74) Attorney, Agent, or Firm—Townsend and Townsend and Crew LLP

(57) ABSTRACT

A graphical display apparatus (and methods) for motor vehicles. The apparatus has a display coupled to an interior portion of a motor vehicle, which faces a driver of the motor vehicle. The display is coupled to an output for identifying a velocity value of the motor vehicle. A first graphical display portion of the display for outputting a first current speed indication of the motor vehicle using a first convention is also included. The first display portion for the current speed indication is coupled to the output. A second graphical display portion of the display for outputting a second current speed indication of the motor vehicle using a second convention is included. The second display portion is coupled to the first display portion such that the first current speed indication in the first convention is aligned to the second current speed indication in the second convention.

21 Claims, 5 Drawing Sheets

SPEEDOMETER DISPLAY AND METHOD FOR MOTOR VEHICLES

CROSS-REFERENCES TO RELATED APPLICATIONS

This present application is related to U.S. Ser. No. 09/976,184 (Porter, Wright, Morris & Arthur, LLP Attorney Docket No. 3996902-136526), commonly assigned, and hereby incorporated by reference for all purposes.

STATEMENT AS TO RIGHTS TO INVENTIONS MADE UNDER FEDERALLY SPONSORED RESEARCH OR DEVELOPMENT

Not applicable

REFERENCE TO A "SEQUENCE LISTING," A TABLE, OR A COMPUTER PROGRAM LISTING APPENDIX SUBMITTED ON A COMPACT DISK.

Not applicable

BACKGROUND OF THE INVENTION

The present invention relates generally to improved instrumentation for motor vehicles. In particular, the invention provides an apparatus and method for an improved display for speed that acts as a speedometer for an automobile. More particularly, the invention provides an apparatus and method for an improved display for reading velocity that acts as a speedometer in one or more measurement conventions, which are coupled to each other. Merely by way of example, the invention is applied to an interior of an automobile, but it would be recognized that the invention has a much broader range of applicability.

In the early days, automotive technologies were fairly crude but effective. Germany's Karl Benz has been recognized with a three wheeled automobile he produced in 1886 as one of the first. Such automobile included an engine that was placed over its rear axle. The engine was a horizontal, four-cycle, single-cylinder type. Horsepower was limiting. Here, the engine produced about 1 horsepower. Belts and chains harnessed such power to rear wheels. A top speed of about 15 km/h could be produced. Mechanical technologies such as a lever connected to a rack-and-pinion controlled a single front wheel to steer the automobile. In the early 1900's, Ford produced a very popular automobile called "The Model T." The Model T had technologies that spread motorization. Such technologies included various mechanisms for easy driving. Examples of such mechanisms included a planetary gear transmission. Most particularly, the Model T was produced in mass production, which provided a low price to allow many people to purchase and enjoy the Model T. More than 15,000,000 units were built from 1908 to 1927, which revolutionized the automotive industry.

Many limitations exist with such early automobiles. For example, they lacked power and had numerous mechanical problems. Such problems have been addressed with many of today's conventional automobiles. These conventional automobiles such as those manufactured by Nissan Motor Company and others have horsepower greater than two hundred. Additionally, such automobiles include a wide variety of other features such as automatic windows, power steering, and even microprocessor controls. Engine speed is often displayed on a speedometer, which is indicated in miles per hour ("MPH"). Here, the current MPH of the operating engine is displayed. Often times, such display includes a needle fixed about a point that is directed to one of a plurality of velocities, e.g., 10, 20, 60, 100. Although the automobile has improved, such display has been used for a long time without any improvement.

From the above, it is seen that techniques for improved control of automobiles is desired.

BRIEF SUMMARY OF THE INVENTION

According to the present invention, an improved instrumentation for motor vehicles is provided. In particular, the invention provides an apparatus and method for an improved display for speed that acts as a speedometer for an automobile. More particularly, the invention provides an apparatus and method for an improved display for reading velocity that acts as a speedometer in one or more measurement conventions, which are coupled to each other. Merely by way of example, the invention is applied to an interior of an automobile, but it would be recognized that the invention has a much broader range of applicability.

In a specific embodiment, the invention provides a graphical display apparatus for motor vehicles. The apparatus has a display coupled to an interior portion of a motor vehicle, which faces a driver of the motor vehicle. The display is coupled to an output for identifying a velocity value of the motor vehicle. A first graphical display portion of the display for outputting a first current speed indication of the motor vehicle using a first convention is also included. The first display portion for the current speed indication is coupled to the output. A second graphical display portion of the display for outputting a second current speed indication of the motor vehicle using a second convention is included. The second display portion is coupled to the first display portion such that the first current speed indication in the first convention is aligned to the second current speed indication in the second convention.

In an alternative embodiment, the invention provides a method for displaying engine characteristics of motor vehicles. The method includes receiving a velocity information from an interface coupled to an engine of an operating motor vehicle. The velocity information corresponds to only one of a plurality of velocities ranging from zero to greater than 100. The velocity information corresponds to one of the plurality of velocities of the operating motor vehicle at a present time of receiving the velocity information. The method converts the velocity information into a velocity display format. The method then displays using an annular configuration a first velocity indication in a first convention giving an appearance of rotation about a fixed axis based upon the velocity display format. The first velocity indication is one of the velocities based upon the velocity information of the operating motor vehicle.

Numerous benefits are achieved using the present invention over conventional techniques. In a specific embodiment, the present invention provides a display having both miles per hour and kilometers per hour indications that are easy to read. The invention can also be implemented using conventional hardware and software technologies. In a specific embodiment, the invention also provides a way of changing the speed indication from miles per hour to kilometers and the other way around in an easy manner. Depending upon the embodiment, one or more of these benefits or features can be achieved. These and other benefits are described throughout the present specification and more particularly below.

The accompanying drawings, which are incorporated in and form part of the specification, illustrate embodiments of

DETAILED DESCRIPTION OF THE INVENTION

According to the present invention, an improved instrumentation for motor vehicles is provided. In particular, the invention provides an apparatus and method for an improved display for speed that acts as a speedometer for an automobile. More particularly, the invention provides an apparatus and method for an improved display for reading velocity that acts as a speedometer in one or more measurement conventions, which are coupled to each other. Merely by way of example, the invention is applied to an interior of an automobile, but it would be recognized that the invention has a much broader range of applicability.

Figure 1:
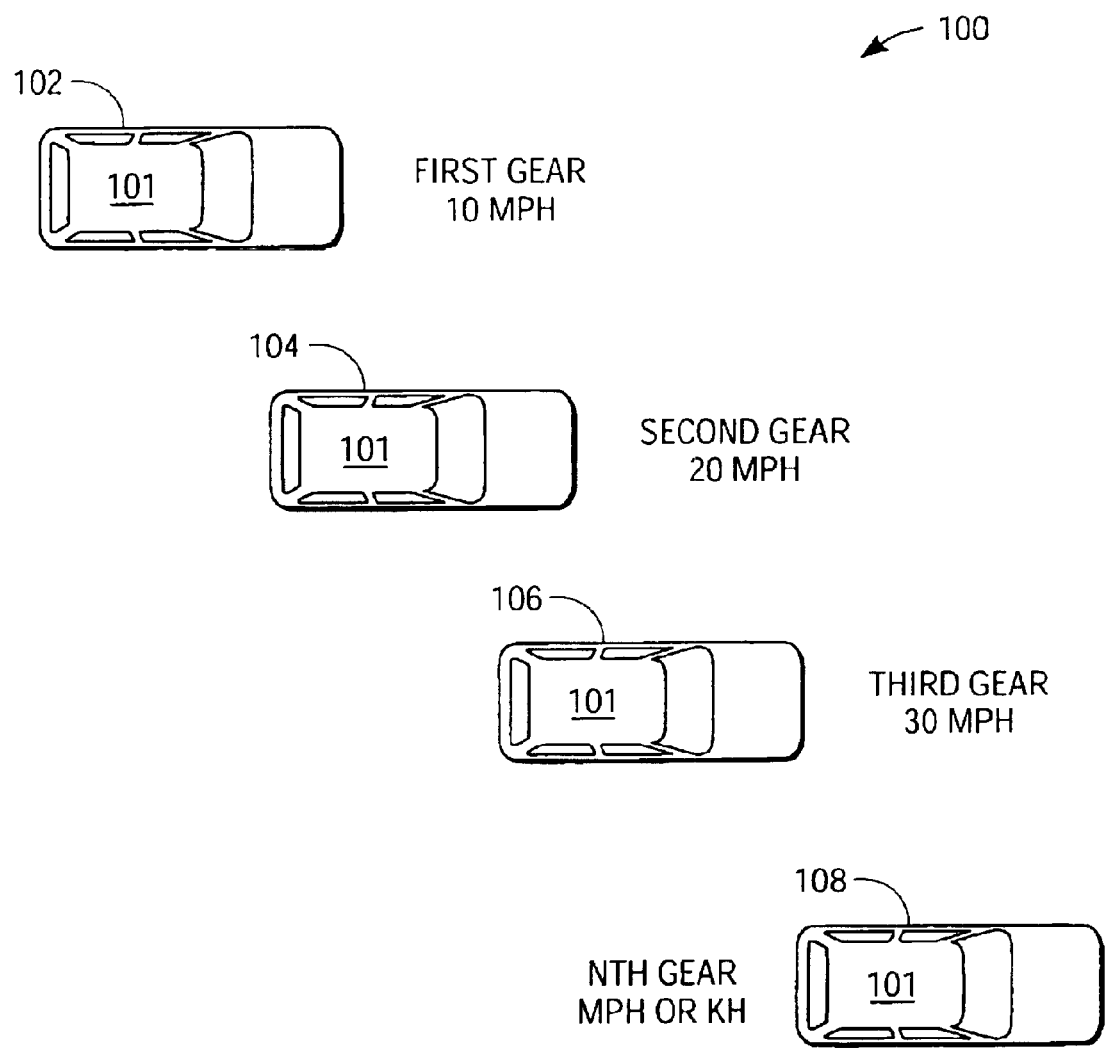
FIG. 1 is a simplified diagram of a moving automobile according to an embodiment of the present invention.

FIG. 1 is a simplified diagram 100 of a moving automobile according to an embodiment of the present invention. This diagram is merely an example, which should not unduly limit the scope of the claims herein. One of ordinary skill in the art would recognize many other variations, modifications, and alternatives. As shown, the moving automobile is illustrated as automobile 101, which shifts from first gear 102 at ten miles per hour, to second gear 104 at twenty miles per hour, to third gear 106 at thirty miles per hour, and to an Nth gear 108. Going forward, the velocity of the moving automobile is indicated using a speedometer. Such speedometer is often indicated in miles per hour or kilometers per hour. The present invention provides a novel display for outputting information associated with the speed of the moving automobile. Details of a novel display and method for indicating automobile speed are described throughout the present specification and more particularly below.

Figure 2:
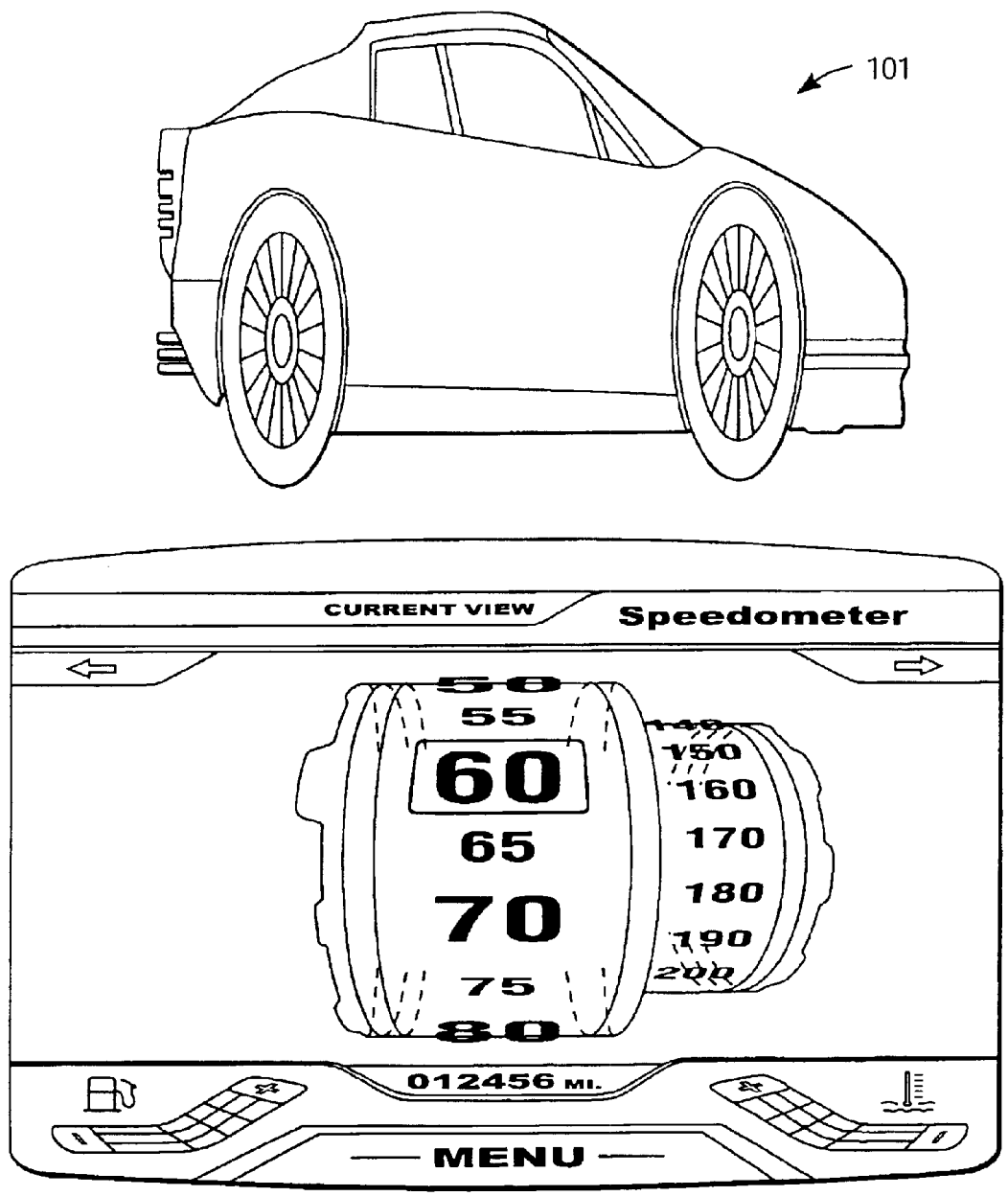
FIG. 2 is a simplified diagram of an automobile according to an embodiment of the present invention.

FIG. 2 is a simplified diagram of an automobile 101 according to an embodiment of the present invention. This diagram is merely an example, which should not unduly limit the scope of the claims herein. One of ordinary skill in the art would recognize many other variations, modifications, and alternatives. As shown, the automobile 101 has a graphical user interface including a novel speedometer design. Such speedometer design faces a driver of the automobile. Preferably, the speedometer is provided in an internal dash board of the automobile. The dashboard may also include other instrumentation. Further details of the graphical user interface including methods are described throughout the present specification and more particularly below.

Figure 3:
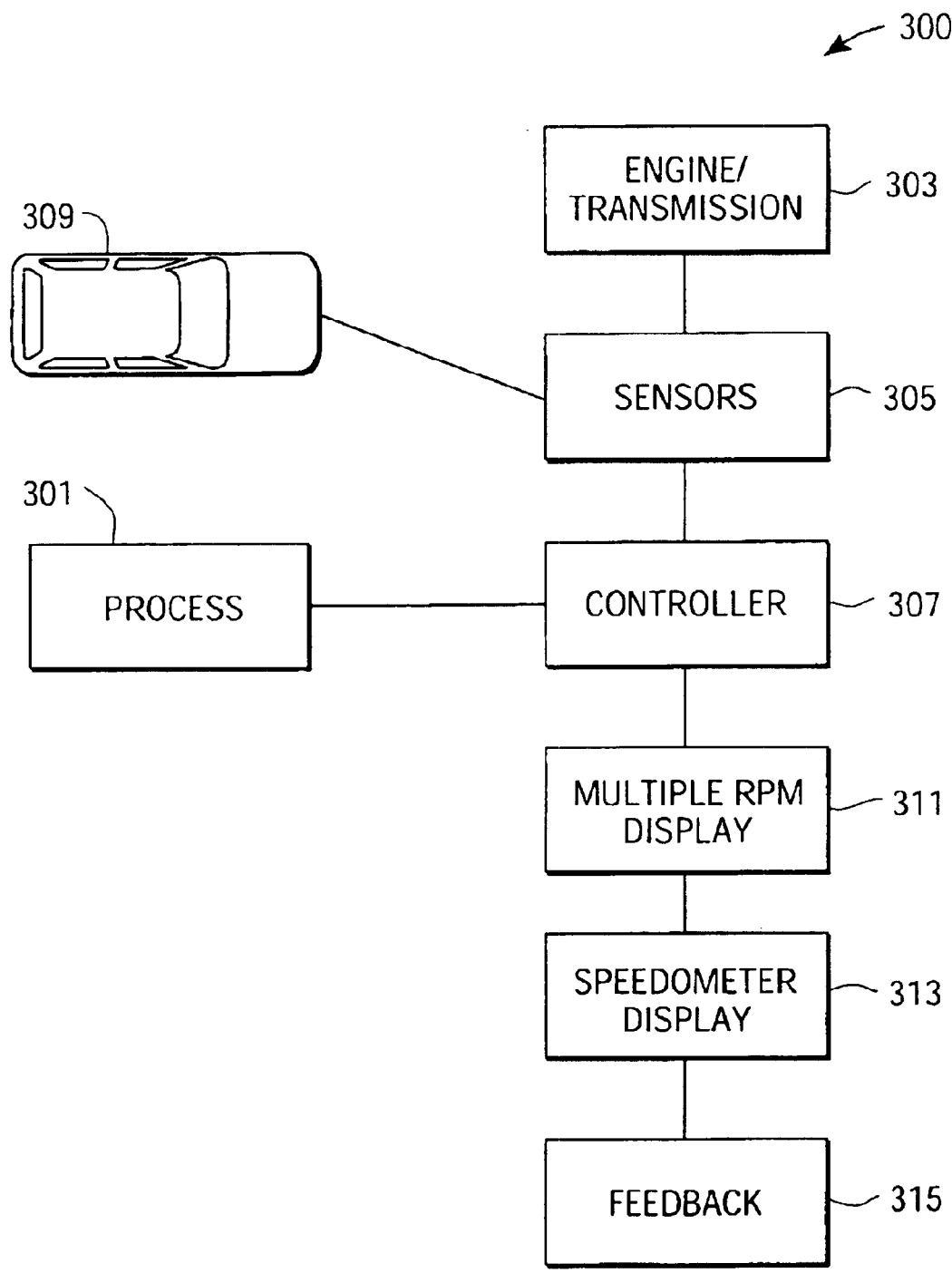
FIG. 3 is a simplified block diagram of an automotive system according to an embodiment of the present invention.

FIG. 3 is a simplified block diagram of an automotive system 300 according to an embodiment of the present invention. This diagram is merely an example, which should not unduly limit the scope of the claims herein. One of ordinary skill in the art would recognize many other variations, modifications, and alternatives. As shown, a motor vehicle includes an engine 303 and transmission, and a tachometer 311, which determines and indicates multiple RPM values to the driver of the automobile. The engine and transmission can be of any suitable type as known to one of ordinary skill in the art. The transmission has a plurality of gears, which can be engaged including a current gear, which is engaged and a plurality of different gears, which are not currently engaged but, which can be engaged. The transmission can be automatic or manual depending upon the embodiment.

Sensors 305 are operatively coupled to the engine and transmission and other components of the automobile to receive information or data indicating current operating conditions of the motor vehicle. Sensors 305 obtain information regarding the current engine RPM and current vehicle speed. As merely an example, sensors can sense sparks emitted by a running engine, which are used to determine the current engine RPM or any other suitable information to determine the current engine RPM. It is noted that alternatively, the current engine RPM can be directly provided to the tachometer. The sensors also obtain information regarding the gear the transmission is currently operating in, that is, the current gear. The sensors preferably provide, either directly or information to determine, the current speed of the automobile as well as any other desired current condition of the automobile. Additionally, sensors can be used to provide the speed or velocity of the vehicle for display 313. The velocity can also be provided directly to the display through a mechanical mechanism in some embodiments. The system also has a feedback mechanism 315, which is coupled to the controller.

Instrumentation is also included in the system. Here, the tachometer includes a central processing unit or controller 307 for determining the current engine RPM value and/or predicted engine RPM values and the display 311 for providing a visual or observable indication of the current engine RPM value and a visual or observable indication of predicted RPM values. The controller can be any suitable type having memory and processing. Such controller is operably coupled to sensors to receive signals form the sensors. The controller can be adapted to receive current engine RPM values and provide a suitable signal to display, which indicates the current engine RPM or adapted to receive information such as engine spark from the sensors, which determine the current engine RPM, and provide a suitable signal to the display, which indicates the current engine RPM. The speedometer is also coupled to the controller 307. Here, the controller is coupled to the engine and transmission to receive information about the engine speed. The information is converted into a format suitable for display on the speedometer. Preferably, the speedometer is a graphical user device, which is controlled by the controller. The graphical user device allows the drive to select from different conventions such as miles per hour or kilometers per hour.

The controller 307 is adapted to receive signals from the engine and/or transmission for current conditions. The controller is adapted to receive signals indicating the current gear of the transmission and the current vehicle speed. With such information and the current RPM, the controller determines predicted engine RPM values for transmission gears higher and/or lower than the current gear, which is not currently being used by the automobile. The predicted RPM values indicate or predict what the engine RPM would be if the transmission was currently engaged in a gear different from the current gear such that the drive can see the predicted effect of an immediate gear shift to a different gear. The system includes one or more processes 301 for determining the predicted engine RPM value, which are stored in memory or embedded memory. The one or more processes are preferably provided through dynamometer testing of the engine type or the specific engine but can alternatively be developed by other suitable testing or by real results. The controller is adapted to send suitable signals indicating the predicted engine RPM values for different gears, which are not currently in use.

The system also has multiple RPM display 311 and speedometer display 313. Such displays are operably coupled to the controller, which couple to the sensors. The displays are provided to indicate automobile characteristics. The display can be of any suitable type such as a CRT screen, an LED screen, a LCD screen, an analog or digital meter or gauge, or the like, which can suitably display digital and/or analog information. Depending upon the embodiment, there can be many other modifications, alternatives, and variations. Further details of the graphical user interface including methods are described throughout the present specification and more particularly below.

Figure 4:
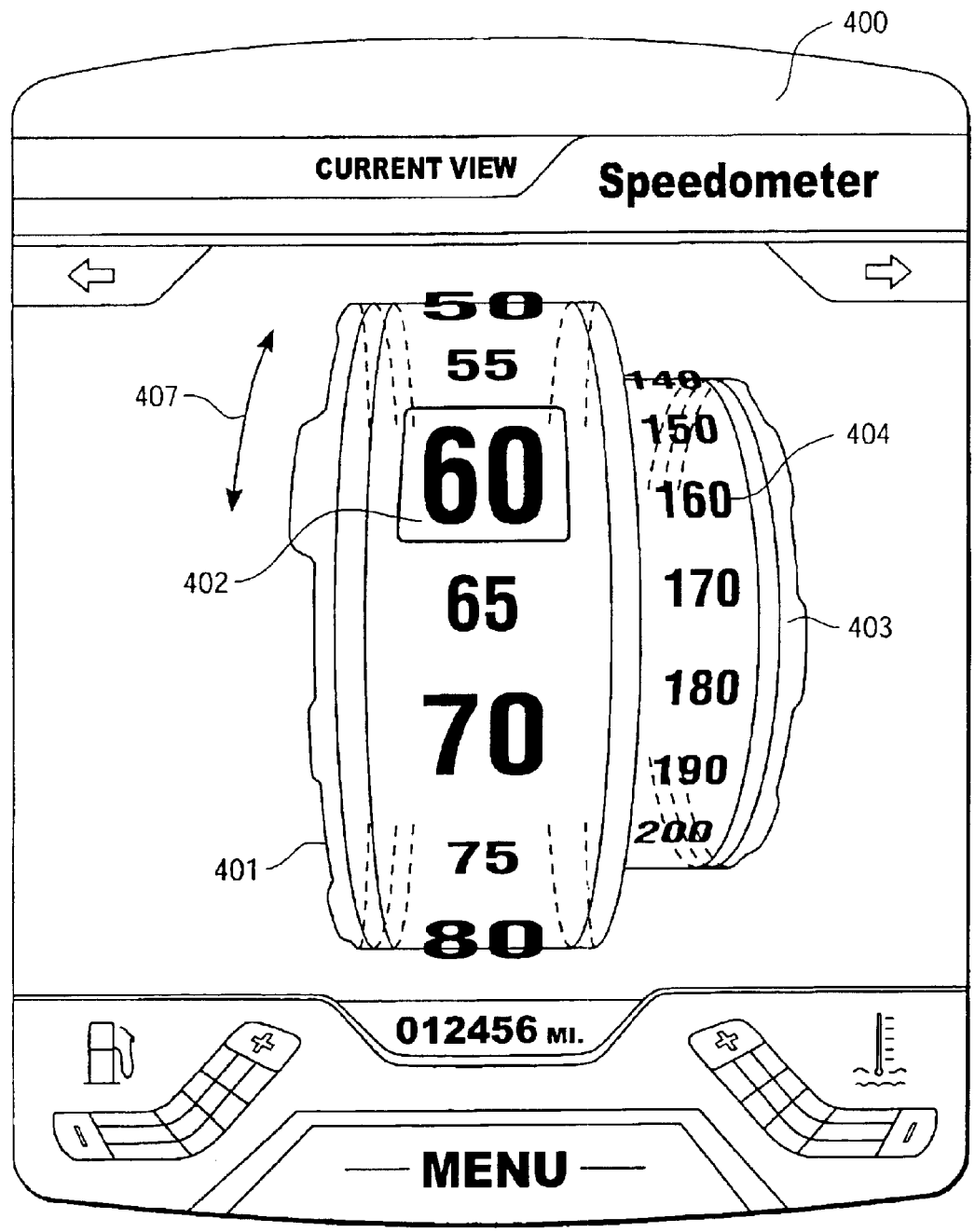
FIG. 4 is a simplified diagram of a graphical user display for a tachometer according to an embodiment of the present invention.

FIG. 4 is a simplified diagram of a graphical user display 400 for a speedometer according to an embodiment of the present invention. This diagram is merely an example, which should not unduly limit the scope of the claims herein. One of ordinary skill in the art would recognize many other variations, modifications, and alternatives. As shown, the display apparatus 400 for motor vehicles has a display coupled to an interior portion of a motor vehicle and facing a driver of the motor vehicle. The display is coupled to an output for identifying a velocity value of the motor vehicle. A first graphical display portion 401 of the display for outputting a first current speed indication 402 of the motor vehicle using a first convention-miles per hour. The first display portion for the current speed indication is coupled to the output. A second graphical display portion 403 of the display for outputting a second current speed indication 404 of the motor vehicle using a second convention. The second display portion is coupled to the first display portion such that the first current speed indication in the first convention is aligned to the second current speed indication in the second convention. As the speed changes, the speed indications give an appearance of revolving 407, where lower speed values appear as the first display portion revolves in a first direction and higher speed values appear as the first display portion revolves in a second direction.

As also shown, the first current speed indication is larger in size than the second current speed indication. In some embodiments, the convention of the first and second display portions are interchangeable. Each of the display portions is annular in shape and provides an appearance of movement. Preferably, each of the display portions appear in three dimensions, which give an appearance of a revolving ring structure, where the numerical values of the speed are provided. The numerical values are provided where they revolve about an axis of rotation. In a specific embodiment, the first current speed indication is among a range of speeds from zero to greater than 100 miles per hour and the second current speed indication is among a range of speeds from zero to 200 kilometers per hour. As further shown, the first current speed indication and the second current speed indication are displayed simultaneously.

Figure 5:
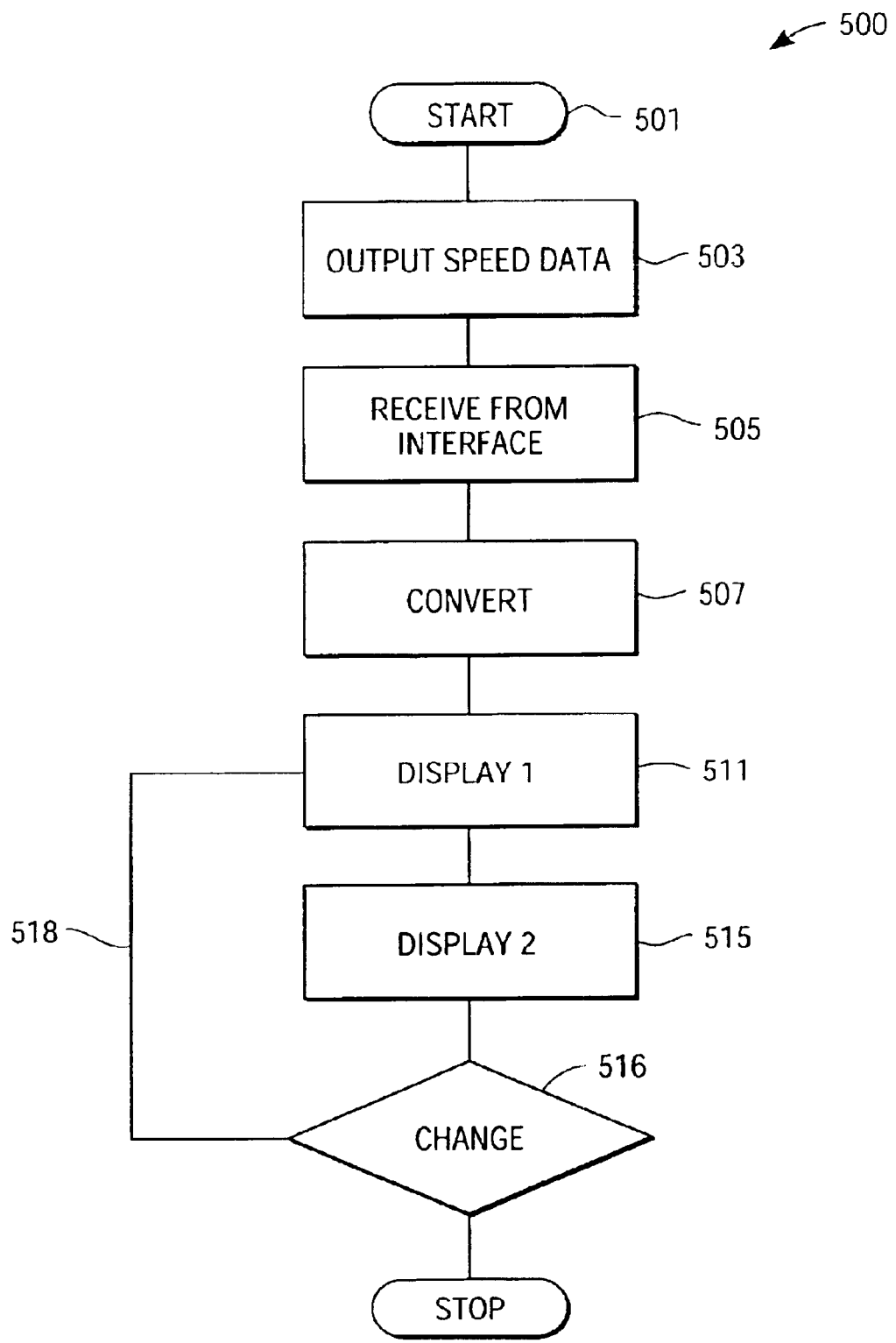
FIG. 5 is a simplified diagram of a method according to an embodiment of the present invention

FIG. 5 is a simplified diagram of a method 500 according to an embodiment of the present invention. This diagram is merely an example, which should not unduly limit the scope of the claims herein. One of ordinary skill in the art would recognize many other variations, modifications, and alternatives. As shown, the method begins with start, step 501. Here, the method is a way of displaying engine characteristics of motor vehicles. In a specific embodiment, the engine and transmission output (step 503) information associated with the speed of the automobile to an interface. The speed is preferably the current speed of the moving or still automobile. The method receives (step 505) the speed or velocity information from the interface coupled to an engine of the operating automobile. The velocity information corresponds to only one of a plurality of velocities ranging from zero to greater than 100. The velocity information corresponds to one of the plurality of velocities of the operating motor vehicle at a present time of receiving the velocity information.

Next, the method converts (step 507) the velocity information into a velocity display format, which is used by a display. The method then displays (step 511) using an annular configuration a first velocity indication in a first convention giving an appearance of rotation about a fixed axis based upon the velocity display format. The first velocity indication is one of the velocities based upon the velocity information of the operating motor vehicle. Preferably, the velocity indication shows the current speed of the motor vehicle. The method also displays using an annular configuration a second velocity indication in a second convention giving an appearance of rotation about the fixed axis based upon the velocity display format. The first velocity indication is coupled to the second velocity indication. The method may also include other steps, depending upon the embodiment. As the speed of the automobile changes, the display portions appear to rotate where the speed values are fixed about an annular structure.

The above figures describe aspects of the invention illustrated by elements in simplified system and method diagrams. As will be understood by one of ordinary skill in the art, the elements can be implemented in computer software. The elements can also be implemented in computer hardware. Alternatively, the elements can be implemented in a combination of computer hardware and software. Some of the elements may be integrated with other software and/or hardware, or specialized hardware (e.g. an ASIC). Alternatively, some of the elements may be combined together or even separated. These and other variations, modifications, and alternatives will be apparent by one of ordinary skill in the art.

While the invention is described in conjunction with the preferred embodiments, this description is not intended in any way as a limitation to the scope of the invention. Modifications, changes, and variations, which are apparent to those skilled in the art can be made in the arrangement, operation and details of construction of the invention disclosed herein without departing from the spirit and scope of the invention.

What is claimed is:

1. A graphical display apparatus for motor vehicles, the display comprising:

a display coupled to an interior portion of a motor vehicle and facing a driver of the motor vehicle, the display being coupled to an output for identifying a velocity value of the motor vehicle;

a first graphical display portion of the display for outputting a first current speed indication of the motor vehicle using a first convention, the first graphical display portion for the first current speed indication being coupled to the output; and a second graphical display portion of the display for outputting a second current speed indication of the motor vehicle using a second convention, the second graphical display portion being coupled to the first graphical display portion such that the first current speed indication in the first convention is aligned to the second current speed indication in the second convention;

wherein the first graphical display portion comprises a first annular structure that appears to revolve about a fixed axis and displays the current speed indication on the first annular structure, and the second graphical display portion comprises a second annular structure that appears to revolve about the fixed axis and displays the second current speed indication on the second annular structure, wherein a diameter of the first annular structure is larger than a diameter of the second annular structure, lower speed values appear on the first graphical display portion as the first annular structure appears to revolve in a first direction, and higher speed values appear on the first graphical display portion as the first annular structure appears to revolve in a second direction, lower speed values appear on the second graphical display portion as the second annular structure appears to revolve in the first direction, and higher speed values appear on the second graphical display portion as the second annular structure appears to revolve in the second direction, and the first annular structure and the second annular structure appear to revolve at the same rotational speed.

2. The graphical display of claim 1 wherein the first convention is miles per hour and the second convention is kilometers per hour.

3. The graphical display of claim 1 wherein the first current speed indication is larger in size than the second current speed indication.

4. The graphical display of claim 1 wherein the display is selected from a CRT, a flat panel display, an active matrix display, or a plasma display.

5. The graphical display of claim 1 wherein the motor vehicle is an automobile.

6. The graphical display of claim 1 wherein the second graphical display portion is external to the first graphical display portion.

7. The graphical display of claim 1 wherein the first current speed indication is among a range of speeds from zero to greater than 100 miles per hour.

8. The graphical display of claim 1 wherein the second current speed indication is among a range of speeds from zero to 200 kilometers per hour.

9. The graphical display of claim 1 wherein the first current speed indication and the second current speed indication are displayed simultaneously.

10. The graphical display of claim 1 wherein the first annular structure is centered in the display.

11. The graphical display of claim 10 wherein the second annular structure is offset from the center of the display.

12. A method for displaying engine characteristics of motor vehicles, the method comprising:

receiving a velocity information from an interface coupled to an engine of an operating motor vehicle, the velocity information corresponding to only one of a plurality of velocities ranging from zero to greater than 100, the velocity information corresponding to one of the plurality of velocities of the operating motor vehicle at a present time of receiving the velocity information;

converting the velocity information into a velocity display format; and displaying using a first annular configuration a first velocity indication in a first convention giving an appearance of rotation about a fixed axis based upon the velocity display format, the first velocity indication being one of the velocities based upon the velocity; information of the operating motor vehicle and being displayed on the annular configuration, and displaying using a second annular configuration a second velocity indication in a second convention giving an appearance of rotation about the fixed axis based upon the velocity display format, the first velocity indication being coupled to the second velocity indication, wherein a diameter of the first annular configuration is larger than a diameter of the second annular configuration, lower speed values appear on the first annular configuration as the first annular configuration appears to revolve in a first direction, and higher speed values appear on the first annular configuration as the first annular structure appears to revolve in a second direction, lower speed values appear on the second annular configuration as the annular configuration appears to revolve in the first direction, and higher speed values appear on the annular configuration as the annular configuration appears to revolve in the second direction, and the first annular configuration and the second annular configuration appear to revolve at the same rotational speed.

13. The method of claim 12 wherein the velocity indication shows speed of the motor vehicle.

14. The method of claim 12 wherein the annular configuration is oriented in a vertical manner.

15. The method of claim 12 wherein the first convention is miles per hour.

16. The method of claim 12 wherein the fixed axis is perpendicular to the annular configuration.

17. The method of claim 12 wherein the first velocity indication-is displayed simultaneously with the second velocity indication.

18. The method of claim 17 wherein the first convention is miles per hour and the second convention is kilometers per hour.

19. The method of claim 12 wherein the first annular configuration is centered in the display, and the second annular configuration is offset from the center of the display.

20. A graphical display apparatus for motor vehicles, the display comprising:

a display coupled to an interior portion of a motor vehicle and facing a driver of the motor vehicle, the display being coupled to an output for identifying a velocity value of the motor vehicle;

a first graphical display portion of the display for outputting a first current speed indication of the motor vehicle using a first convention, the first graphical display portion for the first current speed indication being coupled to the output; and a second graphical display portion of the display for outputting a second current speed indication of the motor vehicle using a second convention, the second graphical display portion being coupled to the first graphical display portion such that the first current speed indication in the first convention is aligned to the second current speed indication in the second convention;

wherein the first current speed indication is a first annular structure that appears to revolve about a fixed axis;

the second current speed indication is a second annular structure that appears to revolve about the fixed axis, a diameter of the first annular structure is larger than a diameter of the second annular structure, lower speed values appear on the first graphical display portion as the first annular structure appears to revolve in a first direction, and higher speed values appear on the first graphical display portion as the first annular structure appears to revolve in a second direction, lower speed values appear on the second graphical display portion as the second annular structure appears to revolve in the first direction, and higher speed values appear on the second graphical display portion as the second annular structure appears to revolve in the second direction, the first annular structure and the second annular structure appear to revolve at the same rotational speed, the first annular structure is centered in the display, and the second annular structure is offset from the center of the display.

21. The graphical display of claim 20 wherein the second graphical display portion is external to the first graphical display portion.

* * * * *